(12) United States Patent
Eckstein et al.

(10) Patent No.: US 10,814,936 B2
(45) Date of Patent: Oct. 27, 2020

(54) CORE LAYER HAVING WOOD ELEMENTS, IN PARTICULAR WOOD ELEMENTS HAVING A CORRUGATED STRUCTURE

(71) Applicant: WOOD INNOVATIONS LTD, Eschen (LI)

(72) Inventors: Thomas Eckstein, Dresden (DE); Achim Moeller, Dresden (DE); Hans-Joachim Danzer, Zug (CH)

(73) Assignee: WOOD INNOVATIONS LTD, Eschen (LI)

( * ) Notice: Subject to any disclaimer, the term of this patent is extended or adjusted under 35 U.S.C. 154(b) by 0 days.

(21) Appl. No.: 16/102,481

(22) Filed: Aug. 13, 2018

(65) Prior Publication Data

US 2019/0009862 A1 Jan. 10, 2019

Related U.S. Application Data

(63) Continuation of application No. 15/034,491, filed as application No. PCT/EP2014/002965 on Nov. 5, 2014, now Pat. No. 10,053,191.

(30) Foreign Application Priority Data

Nov. 6, 2013 (EP) ..................................... 13005226

(51) Int. Cl.
*B63B 5/24* (2006.01)
*E06B 11/02* (2006.01)
(Continued)

(52) U.S. Cl.
CPC ................ *B63B 5/24* (2013.01); *A47B 96/02* (2013.01); *B32B 7/12* (2013.01); *B32B 21/14* (2013.01);
(Continued)

(58) Field of Classification Search
CPC .. B63B 5/24; A47B 96/02; B32B 7/12; B32B 21/14; B32B 37/12; B32B 37/14;
(Continued)

(56) References Cited

U.S. PATENT DOCUMENTS 4,061,813 A 12/1977 Geimer et al.
5,290,621 A * 3/1994 Bach ........................ B27N 5/00
428/174
(Continued)

FOREIGN PATENT DOCUMENTS

BE 547811 5/1956
CH 254025 4/1948
(Continued)

OTHER PUBLICATIONS

Ritter "Timber Bridges: Design, Construction, Inspection, and Maintenance," U.S. Dept. of Agriculture, Forest Service, Jun. 1990, Chapter 3, pp. 3-1 to 3-6, 8 pages.
(Continued)

*Primary Examiner* — David Sample
*Assistant Examiner* — Donald M Flores, Jr.
(74) *Attorney, Agent, or Firm* — Sheridan Ross P.C.

(57) ABSTRACT

A core layer suitable for a multilayer composite including at least one surface layer and one core layer, the surface layer arranged to at least partially cover the core layer and be fixedly connected thereto, wherein the core layer has elements composed of wood, which elements have plate-like regions arranged in zig-zag-shaped fashion, wherein a plate-like zig region of an element with an adjoining plate-like zag region of the element form a common edge between them, in such a way that the wood element of zig-zag-shaped form is formed, wherein elements of zig-zag-shaped form are arranged in the core layer such that two such edges of two different elements cross one another at a non-zero angle, and
(Continued)

Figure 1:
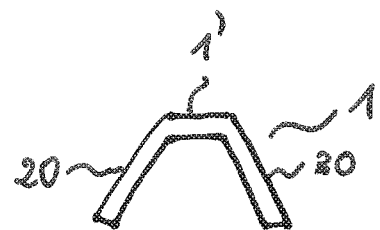

wherein the two elements are fixedly connected to one another at the crossing point. In one embodiment, a wood element of zig-zag-shaped form may be adhesively bonded to a planar wood element.

20 Claims, 5 Drawing Sheets

(51) Int. Cl.
| | |
|---|---|
| B32B 7/12 | (2006.01) |
| B32B 21/14 | (2006.01) |
| B32B 37/12 | (2006.01) |
| B32B 37/14 | (2006.01) |
| B60J 5/04 | (2006.01) |
| B62D 29/02 | (2006.01) |
| E04C 2/12 | (2006.01) |
| A47B 96/02 | (2006.01) |
| E06B 3/70 | (2006.01) |
| E04C 2/34 | (2006.01) |
| E04C 2/32 | (2006.01) |
| E04C 2/26 | (2006.01) |

(52) U.S. Cl.
CPC .............. *B32B 37/12* (2013.01); *B32B 37/14* (2013.01); *B60J 5/042* (2013.01); *B62D 29/02* (2013.01); *E04C 2/12* (2013.01); *E04C 2/26* (2013.01); *E04C 2/32* (2013.01); *E04C 2/3405* (2013.01); *E06B 3/7015* (2013.01); *E06B 11/02* (2013.01); *B32B 2479/00* (2013.01); *B32B 2605/00* (2013.01); *E04C 2002/345* (2013.01); *E04C 2002/3444* (2013.01); *E04C 2002/3455* (2013.01); *E04C 2002/3466* (2013.01); *E04C 2002/3472* (2013.01); *E06B 2003/7019* (2013.01); *Y10T 428/24058* (2015.01); *Y10T 428/24066* (2015.01); *Y10T 428/24124* (2015.01); *Y10T 428/24132* (2015.01); *Y10T 428/24628* (2015.01); *Y10T 428/24694* (2015.01); *Y10T 428/25* (2015.01); *Y10T 428/253* (2015.01)

(58) Field of Classification Search
CPC .. B32B 2479/00; B32B 2605/00; B60J 5/042; B62D 29/02; E04C 2/26; E04C 2/32; E04C 2/12; E04C 2/3405; E04C 2002/3444; E04C 2002/3455; E04C 2002/3466; E04C 2002/345; E04C 2002/3472; E04C 2/34; E06B 3/7015; E06B 11/02; E06B 2003/7019; Y10T 428/25; Y10T 428/253; Y10T 428/24132; Y10T 428/24124; Y10T 428/24058; Y10T 428/24628; Y10T 428/24066; Y10T 428/24694

See application file for complete search history.

(56) References Cited

U.S. PATENT DOCUMENTS

| | | | | |
|---|---|---|---|---|
| 5,641,553 | A * | 6/1997 | Tingley | B27N 3/06 |
| | | | | 428/114 |
| 6,004,651 | A | 12/1999 | von Montagelas et al. | |
| 6,511,567 | B1 * | 1/2003 | Ruggie | E04C 2/3405 |
| | | | | 156/205 |
| 6,773,791 | B1 * | 8/2004 | Ruggie | E04C 3/16 |
| | | | | 428/156 |
| 7,077,988 | B2 * | 7/2006 | Gosselin | B27N 5/00 |
| | | | | 264/120 |
| 8,512,498 | B2 * | 8/2013 | Belanger | B27D 1/06 |
| | | | | 156/206 |
| 2005/0241267 | A1 | 11/2005 | Wu | |
| 2010/0078985 | A1 * | 4/2010 | Mahoney | B32B 3/10 |
| | | | | 428/108 |
| 2013/0001827 | A1 | 1/2013 | Trost et al. | |
| 2016/0288880 | A1 | 10/2016 | Eckstein et al. | |
| 2018/0021977 | A1 | 1/2018 | Homann | |

FOREIGN PATENT DOCUMENTS

| | | |
|---|---|---|
| DE | 835646 | 4/1952 |
| DE | 1759648 | 1/1972 |
| DE | 271870 | 9/1989 |
| DE | 4201201 | 7/1993 |
| DE | 10124912 | 12/2002 |
| DE | 102008022805 | 11/2009 |
| DE | 102008022806 | 11/2009 |
| EP | 0855478 | 7/1998 |
| EP | 1923209 | 5/2008 |
| EP | 3272480 | 1/2018 |
| GB | 1069985 | 5/1967 |
| WO | WO 2009/067344 | 5/2009 |
| WO | WO 2015/149942 | 10/2015 |

OTHER PUBLICATIONS

International Search Report prepared by the European Patent Office dated Apr. 13, 2015, for International Application No. PCT/EP2014/002965, 13 pages.
Official Action for U.S. Appl. No. 15/034,491, dated Jul, 28, 2017 16 pages.
Official Action for U.S. Appl. No. 15/034,491, dated Jan. 26, 2018 13 pages.
Notice of Allowance for U.S. Appl. No. 15/034,491, dated Apr. 19, 2018 12 pages.
Official Action (no English translation available) for European Patent Application No. 18164737.1, dated Jul, 2, 2020, 5 pages.

* cited by examiner

CORE LAYER HAVING WOOD ELEMENTS, IN PARTICULAR WOOD ELEMENTS HAVING A CORRUGATED STRUCTURE

CROSS REFERENCE TO RELATED APPLICATIONS

This application is a continuation of U.S. patent application Ser. No. 15/034,491, filed May 4, 2016, which is a national stage application under 35 U.S.C. 371 and claims the benefit of PCT Application No. PCT/EP2014/002965 having an international filing date of 5 Nov. 2014, which designated the United States, which PCT application claimed the benefit of European Patent Application No. 13 005 226.9 filed 6 Nov. 2013, the disclosures of each of which are incorporated herein by reference in their entirety.

FIELD OF THE INVENTION

The present invention relates to a core layer which has wood elements of zig-zag-shaped form, preferably wood elements with an undulating structure, which core layer is suitable for the production of a multilayer composite or in a multilayer composite, preferably for the production of a lightweight panel, and to a multilayer composite which has the core layer. The invention also relates to methods for producing the core layer and the multilayer composite.

BACKGROUND OF THE INVENTION

It is known to use composite materials for the production of multilayer composites, which have relatively high mechanical stability in relation to their weight. Such multilayer composites are used for example in the form of lightweight panels.

CH 254025 relates to a multilayer composite which has two surface panels and a core layer in between, wherein the core layer has at least one layer of folded veneer. The veneer is folded at an angle relative to the fiber direction in the wood.

DE 42 01 201 relates to semifinished products or finished products composed of wood, said products being produced from plate-like areal elements. The plate-like elements may be of zig-zag-shaped form. They may be present in a random distribution together with areal elements, or may be superposed in the manner of scales.

DE 10 2008 022 806 relates to a lightweight panel with an undulating wood veneer layer. The undulations may be of zig-zag-shaped form.

BE 547 811 relates to a core layer composed of two wood elements of zig-zag-shaped form, which are arranged between two surface layers. The wood elements are arranged such that their edges preferably enclose an angle of 90° with one another.

DE 10 2008 022805 A1 relates to an undulating veneer panel and to lightweight panels constructed therefrom. The undulating structure of the wood elements used may be of zig-zag shape, sinusoidal form and trapezoidal form. The wood elements are stacked one inside the other.

EP 1 923 209 relates to a lightweight composite panel with outer layers and a central layer, wherein the central layer is arranged at an angle with respect to the plane of the lightweight composite panel.

Said multilayer composites from the prior art have in common the fact that the core layer can have a broken-up structure. Under the action of a force perpendicular to the surface of the multilayer composite, said multilayer composite has a damping action, because the core layer can be at least partially compressed. A disadvantage of said broken-up core layers is that they can exhibit low homogeneity, which arises owing to relatively large cavities in the core layer. Then, in the case of fastening means, such as for example nails, furniture connectors or screws, being introduced, these may strike cavities in the broken-up core layers. This may result in limited stability of the fastening means in the multilayer composite. This in turn may have the effect that the stability of the multilayer composite on a support, for example on a wall, can be impaired if said multilayer composite is to be fastened to the wall by way of nails or screws. Furthermore, the production of core layers in large format necessitates correspondingly large veneer pieces of high quality.

OBJECT OF THE INVENTION

It is an object of the present invention to provide a core layer and a multilayer composite comprising the core layer, which multilayer composite exhibits improved stability with regard to fastening by way of nails, furniture connectors or screws or equivalent fastening means to a support, for example to a wall, and which multilayer composite makes it possible to realize an increased load-bearing capacity while being of the lowest possible weight.

SUMMARY OF THE INVENTION

Said object is achieved according to the invention by way of a core layer which is suitable for a multilayer composite which has at least one surface layer and one core layer, wherein the surface layer is arranged so as to at least partially cover the core layer and be fixedly connected thereto, and by way of the multilayer composite having the core layer, wherein the core layer has wood elements, which have regions which are arranged in zig-zag-shaped fashion according to an aspect of the invention.

The expressions used below in quotation marks are defined in the context of the invention.

DETAILED DESCRIPTION OF THE INVENTION

First Aspect of the Invention

Core Layer According to the Invention Having Elements of Zig-Zag-Shaped Form Composed of Wood In a first aspect, the invention relates to a core layer, wherein the core layer has elements composed of wood, which elements have plate-like regions which are arranged in zig-zag-shaped fashion, wherein a zig region of an element with an adjoining zag region of the element form a common edge between them, in such a way that the element is of zig-zag-shaped form, and wherein elements are arranged in the core layer such that two such edges of two elements, which edges may be the same as or different from one another, cross one another at a non-zero angle, wherein the two elements are fixedly connected to one another at the crossing point.

In particular, the invention relates to a core layer which is suitable for a multilayer composite which has at least one surface layer and one core layer, wherein the surface layer is arranged so as to at least partially cover the core layer and be fixedly connected thereto, wherein the core layer has elements composed of wood, which elements have plate-like regions which are arranged in zig-zag-shaped fashion, wherein a zig region of an element with an adjoining zag region of the element form a common edge between them, in such a way that the element is of zig-zag-shaped form, and wherein elements are arranged in the core layer such that two such edges of two elements, which edges may be the same as or different from one another, cross one another at a non-zero angle, wherein the two elements are fixedly connected to one another at the crossing point.

The elements composed of wood are (α) situated in the core layer in a random distribution. They may also be (β) arranged in the core layer adjacent to one another and one above the other in random fashion. The elements composed of wood may also (γ) be arranged randomly in the core layer, and the edges may cross one another at different angles. The elements composed of wood may also have the distributions (α) and (β) or the distributions (α) and (γ) or the distributions (β) and (γ) or the distributions (α), (β) and (γ).

Where used in this disclosure, the expression "core layer which is suitable for a multilayer composite" means a core layer which is suitable for the production of a multilayer composite or which may be present in a multilayer composite.

The expression "core layer" means a layer which has a broken-up structure, that is to say has cavities. According to the invention, the core layer has elements composed of wood, which elements have plate-like regions. Said regions are arranged in the element in zig-zag-shaped fashion, wherein a zig region of an element with an adjoining zag region of the element form a common edge between them, in such a way that the wood element is of zig-zag-shaped form.

The expression "of zig-zag-shaped form" is used synonymously with the expression "of zig-zag shape". The elements of zig-zag-shaped form are arranged in the core layer such that two such edges of two elements cross one another at a non-zero angle. At the crossing point of the edges, the two elements are fixedly connected to one another. A suitable connecting means is preferably an adhesive. Suitable adhesives are known in the prior art.

The expression "surface layer" means a layer of a material which serves preferably as a support for the core layer. According to the invention, the surface layer is arranged so as to at least partially, preferably completely, cover the core layer and be fixedly connected thereto. The core layer may also be covered at least partially by at least two surface layers and be fixedly connected thereto. It is then preferably the case that the core layer is situated between the two surface layers. The surface layer may be composed of or include wood. Other materials such as metal sheets or plastics may likewise be used.

The expression "at least partially covered" includes a definition whereby the surface layer may also completely overlap or cover the core layer.

The expression "multilayer composite" means a composite composed of at least one core layer and at least one surface layer.

The expression "non-zero angle" includes a definition whereby the angle is neither 180° nor 360°.

The expression "element" means a component of the core layer or of the multilayer composite. The expression "wood element" also means an object or an article composed of wood.

The expression "plate-like regions" encompasses regions in the form of surfaces. The surfaces may be planar, that is to say flat, or else may be non-planar, that is to say not flat, and then preferably curved, preferably convexly or concavely, or undulating.

The expression "elements composed of wood which have plate-like regions which are arranged in zig-zag-shaped fashion" encompasses a plate-like wood element which is shaped so as to be present in zig-zag-shaped form, for example by virtue of the plate being folded about an edge. A plate of said type may also be doubly folded, in such a way that a zig region is followed by a zag region, which in turn is followed by a zig region. A plate of said type may also be triply folded, in such a way that a zig region is followed by a zag region which is followed by a zig region which in turn is followed by a zag region, etc. Wood elements with an undulating structure are then realized.

The expression "undulation" or "undulating structure" means repeating units of a wood element.

It is preferably the case that edges formed by the zig regions with zag regions in a wood element are oriented parallel to one another.

The expressions "zig region" and "zag region" are used interchangeably. Both the zig region and the zag region are of plate-like form. Said regions may be planar or non-planar, as defined above.

Accordingly, in one embodiment, the invention also relates to a core layer in which wood elements have repeating units of plate-like zig and zag regions which adjoin one another, wherein the common edges formed between the regions preferably run parallel to one another. By way of such an arrangement of zig and zag regions, the element is of zig-zag-shaped form or of zig-zag shape. It can thus have an undulating structure.

The expression "edge" as used here encompasses expressions such as "transition region between a zig region and the adjoining zag region". Said transition region may be an edge of sharp form. The expression also encompasses an edge which is in the form of a curved surface or in the form of a flat (planar) surface. Thus, the expression "edge" as used herein encompasses a sharp edge in the form of a line and also an undulating or corrugated edge in the form of a curved plane or a curved region between a zig region and a zag region. In this embodiment, the zig-zag regions have an undulating structure, that is to say an undulation trough is followed by an undulation peak and vice versa.

The expression "undulation" can be visualized by way of a spatially propagating oscillation.

In one embodiment, the undulation has, in the mathematical sense, both a positive half-wave and a negative half-wave. It thus has a positive and a negative amplitude.

In a further embodiment, the undulation has, in the mathematical sense, only positive half-waves. It thus has positive amplitudes and no negative amplitudes.

The expression "surface of curved form" means a surface of convex form or a surface of concave form or a surface which has both a convex and a concave component. In particular, the expression "curved" also means "curved in continuous fashion".

In one embodiment, the invention relates to a core layer, wherein
(a) the plate-like regions of the wood elements are planar surfaces, and the edge formed between the planar surfaces is a planar surface;
(b) the plate-like regions of the wood elements are surfaces of curved form, and the edge formed between the curved surfaces is a surface of curved form, preferably a surface of convex form;
(c) the plate-like regions of the wood elements are surfaces of curved form, and the edge formed between the curved surfaces is rectilinear;

(d) the plate-like regions of the wood elements are surfaces of curved form, and the edge formed between the curved surfaces is a surface of planar form.

In one embodiment, the core layer has elements of zig-zag-shaped form composed of wood, which elements have plate-like regions which are arranged in zig-zag-shaped fashion, wherein a zig region of an element with an adjoining zag region of the element of zig-zag-shaped form form a common edge between them, and wherein elements of zig-zag-shaped form are arranged in the core layer such that two such edges of two elements of zig-zag-shaped form, which edges may be the same as or different from one another, cross one another at a non-zero angle, wherein the two elements are fixedly connected to one another at the crossing point, wherein the wood elements in the core layer have one or more of the following arrangements (a) to (d):
(a) the plate-like regions of the wood elements are planar surfaces, and the edge formed between the planar surfaces is a planar surface;
(b) the plate-like regions of the wood elements are surfaces of curved form, and the edge formed between the curved surfaces is a surface of curved form;
(c) the plate-like regions of the wood elements are surfaces of curved form, and the edge formed between the curved surfaces is rectilinear;
(d) the plate-like regions of the wood elements are surfaces of curved form, and the edge formed between the curved surfaces is a surface of planar form;
and wherein
($\alpha$) the elements composed of wood in the core layer are provided in a random distribution; or
($\beta$) wherein the elements composed of wood in the core layer are arranged adjacent to one another and one above the other in random fashion; or
($\gamma$) wherein the elements composed of wood in the core layer are arranged randomly, and the edges cross one another at different angles.

In one embodiment, the core layer has the arrangement (a) in combination with the distribution ($\alpha$), ($\beta$) or ($\gamma$), or in combination with two or three of these distributions.

In another embodiment, the core layer has the arrangement (a) and (b) in combination with the distribution ($\alpha$), ($\beta$) or ($\gamma$), or in combination with two or three of these distributions.

In another embodiment, the core layer has the arrangement (a) and (c) in combination with the distribution ($\alpha$), ($\beta$) or ($\gamma$), or in combination with two or three of these distributions.

In another embodiment, the core layer has the arrangement (a) and (d) in combination with the distribution ($\alpha$), ($\beta$) or ($\gamma$), or in combination with two or three of these distributions.

In another embodiment, the core layer has the arrangement (a) and (b) and (c) in combination with the distribution ($\alpha$), ($\beta$) or ($\gamma$), or in combination with two or three of these distributions.

In another embodiment, the core layer has the arrangement (a) and (b) and (d) in combination with the distribution ($\alpha$), ($\beta$) or ($\gamma$), or in combination with two or three of these distributions.

In another embodiment, the core layer has the arrangement (a) and (c) and (d) in combination with the distribution ($\alpha$), ($\beta$) or ($\gamma$), or in combination with two or three of these distributions.

In another embodiment, the core layer has the arrangement (a) and (b) and (c) and (d) in combination with the distribution ($\alpha$), ($\beta$) or ($\gamma$), or in combination with two or three of these distributions.

In another embodiment, the core layer has the arrangement (b) in combination with the distribution ($\alpha$), ($\beta$) or ($\gamma$), or in combination with two or three of these distributions.

In another embodiment, the core layer has the arrangement (b) and (c) in combination with the distribution ($\alpha$), ($\beta$) or ($\gamma$), or in combination with two or three of these distributions.

In another embodiment, the core layer has the arrangement (b) and (d) in combination with the distribution ($\alpha$), ($\beta$) or ($\gamma$), or in combination with two or three of these distributions.

In another embodiment, the core layer has the arrangement (b) and (c) and (d) in combination with the distribution ($\alpha$), ($\beta$) or ($\gamma$), or in combination with two or three of these distributions.

In another embodiment, the core layer has the arrangement (c) in combination with the distribution ($\alpha$), ($\beta$) or ($\gamma$), or in combination with two or three of these distributions.

In another embodiment, the core layer has the arrangement (c) and (d) in combination with the distribution ($\alpha$), ($\beta$) or ($\gamma$), or in combination with two or three of these distributions.

In another embodiment, the core layer has the arrangement (d) in combination with the distribution ($\alpha$), ($\beta$) or ($\gamma$), or in combination with two or three of these distributions.

In one embodiment of the core layer, wood elements of zig-zag-shaped form have repeating units of zig and zag regions, wherein the common edges formed between the regions preferably run parallel to one another, in such a way that the wood elements have an undulating form.

The undulation may be varied in terms of its amplitude and/or wavelength. It is thus possible for both the thickness and likewise the stiffness of the core layer to be influenced.

In one embodiment, the undulation is formed from
(a') wood elements (a), such that the undulation has, as viewed in longitudinal section, repeating units in the shape of a trapezoid; or
(b') wood elements (b), such that the undulation has, as viewed in longitudinal section, repeating units in the form of a sinusoidal function.

It has surprisingly been found that the already good mechanical strength, for example the high compressive and shear strength and stiffness, of a core layer comprising wood elements (a) to (d) can still be improved considerably if the core layer comprises in particular wood elements (b'), or is composed of such wood elements.

Edges or wood elements of the surface layer according to the invention can be produced by virtue of a plate-like element composed of wood being shaped or folded. The plate-like element is then preferably in the form of a veneer.

Suitable devices for shaping or folding are known from the prior art. It is preferably possible for a plate-like wood element to be led through a fast-running profiled roll pair, as described in DE 42 01 201, wherein the profile is configured such that one or more of the arrangements (a) to (d) are formed. The shaping or folding is preferably performed substantially transversely to the wood fiber direction. Here, in one embodiment, the wood structure previously plasticized by the action of moisture and heat is shaped or kinked, that is to say is formed into a joint at the respective fold edge preferably by way of local upsetting of the wood fibers, without the cohesion of the wood part being weakened. The shaping or folding may be performed such that a springback of the regions arranged in zig-zag-shaped fashion in the element of zig-zag-shaped form (of zig-zag shape) into the initial position can be at least substantially prevented.

In a further embodiment, the edge is produced by cutting. In one embodiment, for this purpose, wood is cut using a suitable blade or a suitable cutting edge which is of zig-zag-shaped profile. Devices and methods are known from the prior art, or may be configured similarly to said prior art.

In a further embodiment, the edge and the wood element are produced by shaping as described in US 2013/0001827.

In one embodiment, the folding or cutting or shaping is performed such that the length of the fibers in the resulting wood element is at least twice as long as the thickness of a zig-shaped or zag-shaped region.

The expression "thickness" means the smallest spacing between two surfaces of a zig or a zag region. Said surfaces are spaced apart from one another by the thickness of the plate-like zig or zag regions.

In one embodiment, the thickness of the plate-like element lies in the range from 0.2 mm to 2 mm.

The height of the wood elements of zig-zag-shaped form typically lies in the range from 0.8 mm to 8 mm.

The expression "height" is defined as the shortest spacing between two imaginary planes between which the zig-zag-shaped wood element can be arranged, in such a way that the edges which are formed between zig regions and zag regions of the wood element of zig-zag-shaped form lie within one of said planes.

In one embodiment, the thickness of the wood element lies in the range from 0.2 mm to 2 mm, and the height of the wood element of zig-zag-shaped form lies in the range from 0.8 mm to 8 mm.

In one embodiment, the thickness of the wood element of zig-zag-shaped form amounts to at most $1/10$ of the thickness of the core layer. This ensures adequate homogeneity of the core layer.

The dimensions of the wood elements of zig-zag-shaped form in terms of width and length may vary. Preferred ranges are selected from a range from 2 to 20 cm.

The elements of zig-zag-shaped form or of zig-zag shape that are obtained by way of cutting or folding can be broken down further if desired. Suitable cutting devices are known from the prior art.

It is preferably the case that the edge or edges formed by the zig region and zag region or by the zig and zag regions runs or run non-parallel to the preferential direction of the fibers.

In one embodiment, the fibers in two different wood elements have the same preferential direction.

In a further embodiment, the fibers in two different wood elements have different preferential directions.

In one embodiment, the edge which is formed between a zig region and a zag region of the plate-like wood element runs non-parallel with respect to the fiber direction of the wood element.

The edge that is formed between a zig region and a zag region of the plate-like wood element preferably runs perpendicular to the fiber direction of the wood element.

Accordingly, said embodiment of the core layer is also characterized in that one or more of said edges runs or run perpendicular to the preferential direction of the fibers of the plate-like wood element.

This preferably also means that, in one embodiment, the direction of the fibers in the wood element runs in the direction of the plate-like regions which are arranged in zig-zag-shaped fashion and which adjoin one another, and perpendicular to the common edges of said regions.

The expression "perpendicular to the fiber direction" means that a deviation by an angle of up to approximately 30° is also possible.

In one embodiment, the core layer according to the invention has first plate-like wood elements with regions arranged in zig-zag-shaped fashion and second wood elements with regions arranged in zig-zag-shaped fashion, wherein the first and second wood elements of zig-zag-shaped form may be the same as or different from one another. In one embodiment, the first and second wood elements differ in terms of their dimensions or the type of wood used. It is preferable for the wood fibers in said first and second elements to extend in the same preferential direction.

In general, more than 50% of the wood elements in the core layer are provided so as to be fixedly connected to one another, wherein a zig region of one element with an adjoining zag region of the element form a common edge between them, and wherein elements in the core layer are arranged such that two such edges of two different elements cross one another at a non-zero angle, wherein the two elements are fixedly connected to one another at the crossing point. The wood elements are preferably provided in a random distribution in the core layer.

It is preferable for more than 60%, or more than 70%, or more than 80%, or more than 90% or even 100% of the wood elements in the core layer to be arranged, or randomly distributed, so as to be fixedly connected to one another. It is preferable for 100% of the wood elements to be arranged, or randomly distributed, so as to be fixedly connected to one another. In this embodiment, the core layer according to the invention exhibits greater mechanical stability than a core layer in which not all of the wood elements are fixedly connected to one another.

It may be provided that, in the core layer according to the invention, regions other than said edges of the plate-like wood elements having zig-zag-shaped regions also cross one another. For example, zig regions may cross zig regions of other wood elements such that not the edges but surfaces of the regions cross or overlap, or said edges may cross or overlap with surfaces of the zig regions.

In one embodiment, the core layer has planar elements in addition to the wood elements of zig-zag-shaped form. The expression "planar" encompasses expressions such as "planar-surfaced" or "of planar shape or form" or "of planar-surfaced form or shape". Said planar elements may be selected from: wood, paper, metal, plastic and two or more thereof. Said planar elements may be adhesively bonded to said edges of the plate-like wood elements, which have regions arranged in zig-zag-shaped fashion. If a region of said wood elements of zig-zag-shaped form is adhesively bonded to said planar elements, the internal cohesion of the core layer can be further improved.

In one embodiment, the wood elements of zig-zag-shaped form are produced from veneer or Oriented Strand Board (OSB) chips. In one embodiment, the veneer is provided in the form of a sheet or in the form of strips. In one embodiment, the OSB chips are provided in the form of flocks which have elongate and narrow strands.

In one embodiment, for the production of the core layer according to the invention, use may be made of zig-zag-shaped wood elements which are not glued, that is to say are unglued. The expression "not glued" means that the wood element is not assembled from or composed of glued-together wood or glued-together woods or glued-together wood residues or from glued fibers, strands or chips. Thus, the zig-zag-shaped wood element is composed exclusively of wood. The wood element thus has no adhesive or glue in the interior of the wood element, such as is commonly used in the wood industry for the adhesive bonding of wood. Such known adhesives are based on glutin, casein, urea-formaldehyde, phenol-formaldehyde, resorcinol-formaldehyde, polyvinyl acetate, and/or polyurethane. The use of non-glued zig-zag-shaped wood elements is also advantageous for environmental and cost reasons.

The expression "non-glued wood element" self-evidently does not rule out that two such zig-zag-shaped wood elements in the core layer according to the invention are fixedly connected to one another by way of glue or an adhesive at said crossing point. For this purpose, in one embodiment, it may be provided that, during the production of the core layer, only the edges of the peaks or troughs of the zig-zag-shaped wood elements are provided with glue. In a further embodiment, however, it is possible, during the production of the core layer, for the entire surface of the wood element to be provided with glue, for example by way of the known drum gluing process, by spraying the wood element with glue.

In a further embodiment, for the production of the core layer according to the invention, use may be made of zig-zag-shaped wood elements which are assembled from glued-together wood or glued-together woods or glued-together wood residues or from glued fibers, strands or chips. Thus, wood elements of said type are composed of wood and glue. They have said glue in particular in the interior of the wood element.

In a further preferred embodiment, for the core layer according to the invention, use is made of zig-zag-shaped wood elements which have been subjected to a thermal or heat treatment during the production process. Such wood elements are preferably produced in accordance with a method which has at least the following steps (H1) to (H4):
(H1) providing a planar-surfaced or non-planar-surfaced wood element which has fibers and has lignin on or between the fibers, wherein preferably, the wood element is an unglued wood element;
(H2) heating the wood element from step (H1) to a temperature sufficient to soften or melt at least a part of the lignin;
(H3) deforming the wood element that has been heated in step (H2), in such a way that a wood element of zig-zag shape is formed;
(H4) cooling the wood element deformed, or the zig-zag-shaped wood element formed, in step (H3) to a temperature below the softening or melting temperature of the lignin.

The zig-zag-shaped wood element that is produced is preferably a wood element of undulating form with one or more of the arrangements (a) to (d). Such wood elements exhibit excellent load-bearing capacity, such that they can be used as or for a broken-up core layer or in multilayer composites with a broken-up core layer, which in turn make it possible to realize a high load-bearing capacity while being of relatively low density.

In one embodiment, the invention thus also relates to the use of zig-zag-shaped wood elements in a core layer, wherein the wood elements are produced in accordance with a method which has at least the steps (H1) to (H4):
(H1) providing a planar-surfaced or non-planar-surfaced wood element which has fibers and has lignin on or between the fibers;
(H2) heating the wood element from step (H1) to a temperature sufficient to soften or melt at least a part of the lignin; the temperature preferably amounting to at least 80° C., and the temperature particularly preferably lying in the range from 80 to 400° C.;
(H3) deforming the wood element that has been heated in step (H2), in such a way that a wood element of zig-zag shape is formed;
(H4) cooling the wood element deformed in step (H3);
wherein the deformation in step (H3) is performed such that the ratio of the undulation height to the thickness of the zig-zag-shaped wood element is equal to or greater than 2:1;
wherein the expression "thickness" means the smallest spacing between a top side and the corresponding bottom side of the zig-zag-shaped wood element, and the expression "undulation height" means the shortest spacing between two imaginary, mutually parallel planes between which the zig-zag-shaped wood element can be arranged, in such a way that the undulations lie between said planes;
and wherein, preferably, the wood element from step (H1), and thus also the zig-zag-shaped wood element that is formed, are composed of unglued wood or unglued wood fibers.

Step (H1): In step (H1), a planar-surfaced or non-planar-surfaced wood element is provided. The expression "planar-surfaced" means that all points or surfaces of the wood element lie in one plane. The expression "non-planar-surfaced" means that not all points or surfaces of the wood element lie in one plane. The non-planar-surfaced wood element may accordingly also have at least one region which is planar-surfaced. The expression "region" means a certain area or zone of the wood element. Said wood preferably has long fibers, with lignin being situated between and on the fibers. The length of the fibers preferably corresponds to the length of the wood element.

In a preferred embodiment, in step (H1), use is made of a planar-surfaced or non-planar-surfaced wood element which is not glued, that is to say is unglued. Accordingly, in said embodiment, in step (H1), a wood element is used, preferably in the form of a veneer, preferably a peeled veneer or sliced veneer. Use may also be made of a wood element which is produced by sawing of unglued wood. In a further embodiment, it is also possible for use to be made of a wood element which is obtained by chipping of wood in known machines, for example chipping of roundwood in blade ring chippers. A wood element produced by chipping of roundwood in blade ring chippers is also known under the expression "OSB chip" or "OSB strand".

Furthermore, the wood element is not restricted to a particular wood type. It may be produced from any desired wood type, for example from a wood of a deciduous tree or of a coniferous tree. Furthermore, the wood element is not restricted to a particular raw material quality and/or dimension. This also means that, for the production of a multilayer composite, the wood elements are not restricted to web goods with relatively large dimensions, with use preferably rather being made of relatively "small", scatterable wood elements which can also be arranged randomly. The expression "small" will be defined below in conjunction with the dimensions of the wood element. Said relatively small elements tolerate faults, because faulty elements, in which for example the undulation is not pronounced or elements are partially destroyed, can be filtered out, or can be intentionally also added to the multilayer composite. It is however also possible for zig-zag-shaped wood elements in web form to be used for the production of the core layer according to the invention.

In step (H1), use may also be made of wood elements which are present in different dimensions and different measurements. This may be preferably necessary if it is sought to use OSB chips in the method, because in that case, the measurement variances lie in a relatively large range. Use may also be made of wood elements composed of wood residues and/or low-grade raw wood qualities, assuming that said wood residues are unglued.

The zig-zag-shaped wood element is preferably of single-ply form. The expression "of single-ply form" means that the wood element provided in step (H1) has only one layer or one ply of wood. In particular, the expression "of single-ply form" means that the wood element from step (H1) is not composed of different plies of wood held together by way of an adhesive or glue.

In a known manner, the fibers of a wood element of said type, that is to say of a non-glued wood element, have a preferential direction, and are thus oriented anisotropically. This however does not rule out a situation in which the fiber direction may also vary in regions owing to crookedness, spiral growth or callus growth. This does not mean that this is associated with a turning of the fiber direction by up to 90°, it is rather by all means possible for the fiber direction to turn by up to 30°. Thus, the expression "preferential direction" encompasses a situation in which the directions of individual fibers may deviate by up to 30° from the preferential direction.

Since the fibers of the wood element used in step (H1) are oriented anisotropically, that is to say have a preferential direction, the fibers likewise have a preferential direction after the deformation in step (H3). Said preferential direction takes the form of an undulation. Thus, the undulation has a preferential direction in the undulation direction. Said preferential direction may be the same as or different from that of the wood element provided in step (H1). The fiber direction and the preferential direction are preferably the same. Accordingly, the fibers of the wood elements of step (H1) and of step (H4) each have a preferential direction, which preferential directions may be the same as or different from one another. The preferential directions of the fibers of step (H1) and of those of step (H4) are preferably the same.

Step (H2): The wood element which is provided in step (H1) and which is used in step (H2) is heated. The heating is performed at a temperature which is sufficient to soften or melt at least a part of the lignin which is situated on and between the fibers of the wood element. It is preferably the case that, in step (H2), the wood element is heated to a temperature of at least 80° C., in particular to a temperature in the range from 80 to 400° C., more preferably in the range from 100 to 380° C., more preferably in the range from 120 to 360° C., and even more preferably in the range from 150 to 350° C.

In a particularly preferred embodiment, heating is performed to a temperature in the range from 230° C. to 400° C., more preferably to a temperature from 230 to 380° C., more preferably 230° C. to 350° C. In a further particularly preferred embodiment, heating is performed to a temperature of 250° C. to 400° C., more preferably to a temperature of 250 to 380° C., more preferably 250° C. to 350° C.

If relatively high temperatures are used in step (H2), the heating duration should not be excessively long, in order to prevent damage, for example as a result of scorching or burning. Conversely, in the case of relatively low temperatures, a relatively long heating duration may be necessary. The heating duration preferably lies in the range from 0.005 to 50 seconds, more preferably in the range from 0.005 to 10 seconds, more preferably in the range from 0.005 to 5 seconds, even more preferably in the range from 0.01 to 2 seconds.

The heating may be performed by way of a suitable device and a suitable heat carrier. Use is preferably made of electrically heated devices. Heating by way of hot air or hot water vapor is likewise possible. From experience, heating to at most 200° C. is possible using hot water vapor. Using electrically heated devices, it is possible to achieve even higher temperatures, preferably a temperature in the range from 230° C. to 400° C.

In one embodiment, the heating in step (H2) is performed without a supply of water or water vapor.

Without restriction to one theory, it is assumed that, as a result of the heating action, the lignin situated on and between the fibers of the wood element from step (H1), that is to say the lignin inherent in the wood, at least partially softens or melts. The at least partially softened or molten lignin can then pass by diffusion at least partially to and onto the surface of the deformed wood element. During the cooling in step (H4), said lignin is solidified. Here, the zig-zag-shaped wood element produced in accordance with the method is at least partially coated with lignin. Said effect is easily visually observable to the naked eye, because the surface of the zig-zag-shaped wood element generally exhibits a greater sheen than the surface of the wood element provided in step (H1).

It is also assumed that said lignin layer is involved in causing the zig-zag-shaped wood element to exhibit a strength considerably greater than that of the non-planar-surfaced wood elements known from the prior art.

Furthermore, the subsequent deformation in step (H3) is performed such that the fewest possible fibers break or are damaged even at the extreme points of the undulation, because this would cause the stability of the zig-zag-shaped wood element to be restricted. Fiber breakage however cannot be prevented entirely, because different wood types can also react differently to the deformation in step (H3), for example owing to different density or quality.

In one embodiment, before step (H2), the wood element from step (H1) may have additional lignin, that is to say lignin extraneous to the wood, supplied to it. Under the action of temperature in step (H2), said lignin also at least partially softens or partially melts, wherein the zig-zag-shaped wood element that is produced is additionally at least partially coated with lignin. Said added lignin can thus impart additional strength to the resulting zig-zag-shaped wood element.

The expression "inherent in the wood" thus means that the lignin originates from the wood of the wood element from step (H1), from which the zig-zag-shaped wood element has been produced. The expression "extraneous to the wood" means that the lignin does not originate from the wood from which the zig-zag-shaped wood element has been produced. Thus, the zig-zag-shaped wood element is additionally coated with lignin which is not inherent in the wood.

Step (H3): The wood element that has been heated in step (H2) is deformed in step (H3). Said deformation is performed such that a wood element in the form of a zig-zag-shaped wood element is realized. The expression "zig-zag-shaped" is used synonymously for the expression "undulating" and synonymously for the expression "of undulating form". Here, the zig-zag-shaped or undulating wood elements have one or more of the arrangements (a) to (d), namely (a) the plate-like regions of the wood elements are planar surfaces, and the edge formed between the planar surfaces is a planar surface;

(b) the plate-like regions of the wood elements are surfaces of curved form, and the edge formed between the curved surfaces is a surface of curved form;
(c) the plate-like regions of the wood elements are surfaces of curved form, and the edge formed between the curved surfaces is rectilinear;
(d) the plate-like regions of the wood elements are surfaces of curved form, and the edge formed between the curved surfaces is a surface of planar form.

The expression "undulating" means an undulation which has at least one undulation peak (undulation crest) or one undulation trough, or one undulation peak and one undulation trough.

The deformation in step (H3) is preferably performed by way of a profiled tool. The expression "profiled tool" means that rounded portions and/or grooves are situated in the tool or on the tool. Said rounded portions and/or grooves effect the deformation when the planar-surfaced wood element is subjected to the action of the profiled tool. The planar-surfaced wood element may in this case be deformed without the exertion of pressure or under the action of pressure. Suitable profiled tools are known from the prior art, for example from DE 42 01 201 or WO 2009/067344, or may be manufactured analogously to said prior art. Said profiled tools may be adapted to the conditions required for the production of the zig-zag-shaped wood element with one or more of the arrangements (a), (b), (c) or (d), in such a way that the ratio of undulation height to thickness in the wood element that is produced is preferably greater than 2:1. Said profiled tools are preferably additionally heated, specifically if the steps (H2) and (H3) are to be carried out simultaneously.

In a preferred embodiment, the wood element that has been heated in step (H2) is subjected, in step (H3), to the action of at least one profile roll pair.

In a preferred embodiment, the deformation in step (H3) has the step (H3.1):
(H3.1) passing the wood element from step (H1), which has been heated in step (H2), between at least one profile roll pair, the rolls of which rotate in opposite directions.

It is preferable for at least one of the rolls of the at least one profile roll pair to be heated, more preferably electrically heated. It is thus possible for steps (H2) and (H3) to be performed simultaneously.

In one embodiment, it is also possible for use to be made of multiple profile roll pairs positioned in series.

The at least one profile roll pair in step (H3.1), or some other profiled tool capable of performing the deformation, is preferably designed such that the wood element is formed into a zig-zag shape with one or more of the arrangements (a), (b), (c) or (d). It then has at least one undulation peak (undulation crest) or one undulation trough, or one undulation peak and one undulation trough.

In the arrangements (a) and (d), the deformation is performed such that the wood element has an at least partially planar-surfaced region. In the embodiments (b) and (c), the deformation is performed such that the wood element does not have a partially planar-surfaced region.

In one embodiment, the zig-zag-shaped wood element has at least 4 undulation peaks and undulation troughs, that is to say four complete undulations.

If, in step (H2), a wood element is used whose fibers have a preferential direction, the deformation in step (H3) is preferably performed such that the deformation takes place non-parallel with respect to the direction of the fibers of the wood element. Thus, the direction of the fibers also runs non-parallel to an undulation trough or undulation peak, formed during the deformation, of the zig-zag-shaped wood element.

The expression "parallel to an undulation trough or undulation peak" in this case means parallel to an imaginary line situated on the undulation peak (undulation crest) or undulation trough and which constitutes the shortest spacing between the lateral delimitations of the undulation trough or undulation peak.

Thus, the deformation is performed transversely with respect to the fiber direction or the preferential direction of the fibers.

In a preferred embodiment, the deformation in step (H3) is performed such that it takes place perpendicular to the direction of the fibers in the wood element from step (H1). Thus, the direction of the fibers runs perpendicular to an undulation trough or undulation peak, formed during the deformation, in the zig-zag-shaped wood element.

The expression "perpendicular to an undulation trough or undulation peak" in this case means perpendicular to an imaginary line situated on the undulation peak (undulation crest) or undulation trough of the zig-zag-shaped wood element and which constitutes the shortest spacing between the lateral delimitations of the undulation trough or undulation peak. The expression "perpendicular to an undulation trough or undulation peak" also means that a deviation by an angle of up to approximately 30° is possible.

In a preferred embodiment, the deformation in step (H3) is performed such that the longitudinal direction runs perpendicular to an undulation trough or undulation peak.

By way of the preferred deformation transversely with respect to the preferential direction of the fibers, the strength of the wood element (B) produced in accordance with the method is further improved. Specifically, if the deformation from step (H3) runs parallel to the preferential direction of the fibers, this can have the result that the deformation may lead to damage, for example to flattening, of the element, or even to fracture of the wood element. This may also arise if wood elements deformed in this way are loaded with a weight. Such damage cannot occur, or can occur only to an insignificant extent, if the deformation is performed transversely with respect to the fiber direction or perpendicular to the fiber direction. Thus, the stability of a wood element of said type is improved, because damage parallel to the fiber direction cannot occur, or can occur only to an insignificant extent.

Steps (H2) and (H3) may be performed in succession or else simultaneously. In a preferred embodiment, steps (H2) and (H3) are performed simultaneously.

The deformation in step (H3) is preferably performed such that the ratio of the undulation height to the thickness of the undulating wood element (B) is greater than 2:1.

The expression "undulation height" means the sum total of the deflection between an undulation peak and an undulation trough from an imaginary base line which runs between the undulation peak and undulation trough. This also means that the undulation height can be defined as the shortest spacing between two imaginary, mutually parallel planes between which the zig-zag-shaped wood element can be arranged such that the undulations lie between said planes.

The expression "thickness" means the shortest spacing between a top side and the corresponding bottom side of the zig-zag-shaped wood element.

In one embodiment, the ratio of the undulation height to the thickness lies in the range from equal to or greater than 2.0:1 to 70:1 or from equal to or greater than 2.0:1 to 60:1 or from equal to or greater than 2.0:1 to 50:1 or from equal to or greater than 2.0:1 to 40:1 or from equal to or greater than 2.0:1 to 30:1. In a preferred embodiment, the ratio of undulation height to the thickness lies in the range from equal to or greater than 2.0:1 to 15:1, more preferably 3:1 to 10:1, even more preferably 4:1 to 8:1 or 5:1 to 6:1.

The thickness of the wood element (B) preferably does not differ by more than 20% in the region of the undulation peak and in the region of the undulation trough, and, if the wood element has a partially planar-surfaced region, the planar-surfaced region then has a thickness in the range of the thickness of the undulation peak and/or undulation trough.

Step (H4): It is preferably the case that, in step (H4), the wood element deformed in step (H3) is cooled, preferably to a temperature at which the lignin is entirely or at least partially solidified or hardened. Here, the zig-zag-shaped wood element is obtained and is present in physical form. Cooling is preferably performed to ambient temperature, preferably to a temperature in the range from 0 to 40° C., more preferably 10 to 30° C. The cooling may be performed by way of ambient air and/or by way of a blower, that is to say by virtue of the wood element produced in step (H3) being subjected to a direct blowing action, preferably being subjected to a blowing action with air. The produced zig-zag-shaped wood element can then preferably be stored and thereafter supplied for use.

The zig-zag-shaped wood element produced in accordance with the method is not limited in terms of its length and width. It is preferably the case that, in step (H1), a wood element is used in the method which is dimensioned such that the ratio of length to width in the zig-zag-shaped wood element lies in the range from 2:1 to 50:1, more preferably in the range from 2:1 to 40:1. In one embodiment, the product of length×width lies in the range from 10 mm×5 mm to 3000 mm×1000 mm.

It is preferably the case that relatively large zig-zag-shaped wood elements, which are preferably in web form, are subjected to a breaking-down process. This will be discussed in more detail further below.

Relatively small zig-zag-shaped wood elements preferably have a product of length×width in the range from 10×5 mm to 200×100 mm, more preferably 10×5 mm to 100×50 mm, more preferably 10×5 mm to 50×25 mm. The expression "length" means the shortest spacing between a start and an end of the zig-zag-shaped wood element in a longitudinal direction of the wood element, preferably measured in the fiber direction. The expression "width" means the spacing between the side edges transversely with respect to the longitudinal direction of the zig-zag-shaped wood element, preferably measured transversely with respect to the fiber direction.

It is preferably the case that, in step (H1), a wood element is used in the method which is dimensioned such that the zig-zag-shaped wood element obtained in accordance with the method has a thickness in the range from 0.1 to 5 mm, preferably 0.2 mm to 3.5 mm, more preferably 0.2 mm to 2 mm.

The deformation in step (H3) is preferably performed, that is to say the profile of the profiled tool is selected, such that the undulation height of the zig-zag-shaped wood element lies in the range from 1 to 20 mm, preferably 2 to 12 mm, more preferably 2 to 8 mm.

In a preferred embodiment, the thickness of the zig-zag-shaped wood element lies in the range from 0.1 to 5 mm, and the undulation height lies in the range from 1 to 20 mm, wherein the ratio of the undulation height to the thickness of the undulating wood element (B) is greater than 2:1.

In a particularly preferred embodiment, the thickness of the zig-zag-shaped wood element lies in the range from 0.2 to 3.5 mm, and the undulation height lies in the range from 2 to 12 mm, wherein the ratio of the thickness to the undulation height of the zig-zag-shaped wood element is greater than 2:1. In a further particularly preferred embodiment, the thickness of the zig-zag-shaped wood element lies in the range from 0.2 to 2 mm, and the undulation height lies in the range from 2 to 8 mm, wherein the ratio of the undulation height to the thickness of the zig-zag-shaped wood element is greater than 2:1.

The zig-zag-shaped wood elements produced in accordance with the method preferably have a bulk density in the range from 40 to 125 kg/m$^3$, more preferably in the range from 45 to 100 kg/m$^3$, even more preferably in the range from 50 to 80 kg/m$^3$.

In a further embodiment, use may also be made of zig-zag-shaped wood elements with a greater bulk density, for example a bulk density of up to 250 kg/m$^3$.

In one embodiment, before step (H2) is performed, the wood element (A), or the wood from which the wood element (A) is produced, may be subjected to a treatment with water, and use may thus be made of a moist wood element in step (H1). Here, the expression "moist" means a water content of 30% to 150% measured in accordance with DIN 52182. The use of wood elements in step (H1) with a lower water content is likewise possible, preferably with a water content of 5 to 30%.

In a further embodiment, the method may have a drying step. Said drying step is preferably performed before step (H4), preferably subsequently to the deformation in step (H3). In said embodiment, the method is then characterized in that step (H3) has at least the step (H3.2):

(H3.2) drying the deformed wood element obtained in step (H3).

In a further embodiment, it is possible for the strength of the produced zig-zag-shaped wood element to be further improved by way of mechanical working. It is preferably possible, by way of mechanical action, for an undulation peak or an undulation trough to be deformed such that a depression is realized in the undulation peak or undulation trough. Said deformation, which is performed in addition to the deformation in step (H3), is preferably performed after step (H3) or at the same time as step (H3). Accordingly, step (H3) may also have the step (H3.3):

(H3.3) deforming an undulation trough or an undulation peak of an undulation of the undulating wood element such that a depression is realized at least partially in the undulation trough and/or in the undulation peak.

The depression is preferably a fold.

It is furthermore also possible for the wood element obtained in either of steps (H3) and (H4) to be subjected to a further deformation.

In a further embodiment, the zig-zag-shaped wood element obtained after the cooling process in step (H4) can be broken down. Accordingly, after step (H4), the method may also have the step (H5):

(H5) breaking down the wood element obtained in step (H4).

In a further embodiment, the zig-zag-shaped wood element obtained in step (H4) or (H5) may also be subjected to a sieving step (H6). This approach may be preferable if wood elements are to be set to a particular size distribution, or wood elements are to have disruptive residues removed therefrom. Accordingly, the method may also have the step (H6):

(H6) sieving the wood element obtained in step (H4) or step (H5).

In one embodiment, the invention also relates to the use of a zig-zag-shaped wood element, whose surface is at least partially "coated" with lignin and which can be produced in accordance with a method which has at least the steps (H1) to (H3), in the core layer according to the invention. Here, the expression "coated" means that solidified or hardened lignin is situated at least on a part of the surface of the wood element, or that at least a part of the surface of the wood element has lignin. The expression "at least a part of the surface has lignin or is coated with lignin" means that at least 10% of the surface of the wood element, more preferably more than 20% or more than 30% or more than 40% or more than 50% or more than 60% or more than 70% or more than 80% or more than 90% or the entire surface is coated with lignin.

In a further embodiment, the invention relates to the use of a zig-zag-shaped wood element, the surface of which is at least partially coated with lignin, in the core layer according to the invention, wherein the ratio of the undulation height to the thickness of the zig-zag-shaped wood element is equal to or greater than 2:1; wherein the expression "thickness" refers to the shortest spacing between a top side and the corresponding bottom side of the zig-zag-shaped wood element, and the expression "undulation height" means the shortest spacing between two imaginary, mutually parallel planes between which the zig-zag-shaped wood element can be arranged, in such a way that the undulations lie between said planes; and wherein the wood element from step (H1) is composed of unglued wood or unglued wood fibers.

Second Aspect of the Invention

Method for Producing a Core Layer Having Elements of Zig-Zag-Shaped Form Composed of Wood According to a second aspect, the invention relates to a method for producing a core layer having plate-like elements composed of wood, which elements have regions which are arranged in zig-zag-shaped fashion, wherein a zig region of an element with an adjoining zag region of the element form a common edge between them, in such a way that the element is of zig-zag-shaped form or is of zig-zag shape. The elements are arranged in the core layer such that two such edges of two elements, which may be the same as or different from one another, cross one another at a non-zero angle.

In one embodiment, the method has at least the steps (i) and (ii):

(i) providing plate-like elements composed of wood, which elements have regions which are arranged in zig-zag-shaped fashion, wherein a zig region of an element with an adjoining zag region of the element form a common edge between them;
(ii) arranging the elements from step (i) such that two such edges of two elements cross one another at a non-zero angle;
(iii) fixedly connecting the edges from step (ii).

The fixed connection is preferably performed by way of an adhesive or glue.

In a further embodiment, at the crossing point of the edges, the two elements, which may be the same as or different from one another, are fixedly connected to one another by way of planar elements selected from: wood, paper, metal, plastics and two or more thereof, wherein the planar elements are themselves connected, by way of the edges, by way of a suitable connecting means such as preferably an adhesive or glue.

In one embodiment, the arrangement of the elements in step (ii) may be realized by orienting the wood elements, which may be performed either by hand or by machine. The fixed connection in step (iii) may be facilitated by way of the application of pressure, which preferably lies in a range from 0.02 MPa to 1.5 MPa, more preferably in a range from 0.01 to 1.0 MPa.

Each of steps (i) to (iii) may be performed in the presence of a surface layer. The method is then preferably performed such that the wood elements, provided with an adhesive, are placed on the surface layer in step (i) and are oriented thereon in step (ii).

Said arrangement is then preferably covered by a further surface layer and compressed. In the process, a multilayer composite having two surface layers and a core layer situated in between is produced.

The core layer is preferably a core layer according to the first aspect, or produced in accordance with the method of the second aspect, of planar-surfaced form.

Third Aspect of the Invention

Multilayer Composite at Least Having a Surface Layer and a Core Layer

A third aspect of the invention relates to a multilayer composite at least having a surface layer and a core layer according to the invention, wherein the surface layer is arranged so as to at least partially cover the core layer and be fixedly connected thereto, wherein the core layer is a core layer according to the invention as per the first aspect of the invention and the embodiments described therein, or is a core layer produced in accordance with the second aspect and the embodiments described therein.

The surface layer used in the multilayer composites according to the invention may have a material selected from the group: veneer, wooden board, chipboard, fiberboard, plywood board, plastics board, plasterboard, metal sheet, fiber cement board, and two or more thereof.

The at least one surface layer is preferably planar, that is to say of planar-surfaced form. The at least one surface layer is preferably of square or rectangular shape.

The dimensions of the surface layer are not limited. The width and the length of the at least one surface layer preferably lie in each case in the range from 0.50 m to 5 m, more preferably in the range from 1 to 3 m.

A method for producing a multilayer composite according to the invention has already been described above in conjunction with the production of the core layer. The method then has at least the steps (i) to (iii):

(i) providing plate-like elements composed of wood, which elements have regions which are arranged in zig-zag-shaped fashion, wherein a zig region of an element with an adjoining zag region of the element form a common edge between them;
(ii) arranging the elements from step (i) such that two such edges of two elements cross one another at a non-zero angle;
(iii) fixedly connecting the edges of the elements from step (ii);

wherein, in step (ii), the arrangement is performed on a surface layer, and in step (iii), the elements are also fixedly connected to the surface layer, preferably by way of an adhesive.

If desired, it is then possible for that side of the core layer which does not yet have a surface layer to be provided with a surface layer, preferably by way of adhesive bonding to the surface layer.

Fourth Aspect of the Invention

Core Layer Deformed by Compression, and Multilayer Composite Deformed by Compression A fourth aspect of the invention relates to a core layer, and a multilayer composite comprising the core layer, which are of non-planar-surfaced form.

In one embodiment, the core layer according to the invention as per the first aspect, or produced in accordance with the method of the second aspect and the multilayer composite according to the invention as per the third aspect may be subjected to a step of deformation by compression, wherein three-dimensional objects can be produced. For this purpose, the core layer according to the invention, or the multilayer composite according to the invention, may be deformed in a suitable pressing tool. Said deformation may be performed during the production of the core layer or of the multilayer composite, or subsequently thereto.

In one embodiment, only the edges of the core layer or of the multilayer composite are deformed, preferably by compression. It is thereby possible for the cavities to be sealed off at the edges of the core layer or of the multilayer composite. Said deformation by compression may be performed during the joining-together of the core layers or of the multilayer composite, though may also be performed subsequently to the joining-together of the core layers or of the multilayer composite, in a subsequent step, for example by thermal softening of the adhesive at the edges. Said embodiment has the advantage that sealing of the edges, for example by application of a wood strip, preferably of a veneer strip, can be omitted.

During the compression, it is possible for the edge part of the core layer or of the multilayer composite to be provided with a domed profile, that is to say a rounded profile. This is often desirable, for example in the case of high-grade furniture components.

In a further embodiment, it is possible for not only the edge region but also, additionally to or separately from the edge region, further regions of the core layer or of the multilayer composite to be subjected to deformation by compression.

A method for producing three-dimensional wood articles by deformation by compression is described in DD 271870 and DE 101 24 912.

Accordingly, the invention relates, in a fourth aspect, to a multilayer composite, at least having a surface layer and a core layer, wherein the surface layer is arranged so as to at least partially cover the core layer and be fixedly connected thereto, wherein the core layer is a core layer as per the first aspect of the invention and the embodiments described therein, or is a core layer produced in accordance with a method as per the second aspect of the invention and the embodiments described therein; or the multilayer composite is a multilayer composite as per the third aspect of the invention and the embodiments described therein, producible in accordance with a method which has at least the step (i):

(i) deforming, by compression, the multilayer composite as per the third aspect.

In the same way, it is also possible for only the core layer according to the invention as per the first aspect of the invention and the embodiments described therein, or the core layer according to the invention produced in accordance with the second aspect of the invention and the embodiments described therein, to be deformed by compression.

Accordingly, the invention also relates to a core layer which is suitable for a multilayer composite which has at least one surface layer and one core layer, wherein the surface layer is arranged so as to at least partially cover the core layer and be fixedly connected thereto, wherein the core layer has elements composed of wood, which elements have plate-like regions which are arranged in zig-zag-shaped fashion, wherein a zig region of an element with an adjoining zag region of the element form a common edge between them, in such a way that the element is of zig-zag-shaped form, and wherein elements are arranged in the core layer such that two such edges of two elements cross one another at a non-zero angle, wherein the two elements are fixedly connected to one another at the crossing point; producible in accordance with a method which has at least the step (i):

(i) deforming, by compression, the core layer as per the first aspect of the invention and the embodiments described therein; or deforming, by compression, a core layer produced in accordance with a method as per the second aspect of the invention and the embodiments described therein.

Fifth Aspect of the Invention

Use of the Core Layer According to the Invention and of the Multilayer Composite According to the Invention According to a fifth aspect, the invention also relates to the use of the multilayer composite according to the invention or of the core layer according to the invention.

It is preferably possible for the multilayer composite according to the invention or the core layer according to the invention to be used in applications which permit a high level of mechanical loading with a relatively low weight, and/or which require a high damping capacity. In one embodiment, the multilayer composite or the core layer is used for furniture production, for shelving, for transportation packaging, for internal fixtures, in doors and gates, in or as chairs, and in vehicle and ship construction. For this purpose, the multilayer composite or the core layer may be processed in accordance with known methods by cutting, sawing, filing and/or drilling.

The core layer according to the invention, and a multilayer composite which has the core layer according to the invention, for example a lightweight panel, exhibit a high level of compressive strength and strength under load. In this regard, the core layer according to the invention and the multilayer composite according to the invention produced therefrom are superior to the corresponding core layers or multilayer composites produced from industrial waste from chips and fiberboards.

Furthermore, dimensional changes in the core layer or in the multilayer composite under the influence of moisture, in particular dimensional changes in the direction of the thickness of the core layer or of the multilayer composite, can be negligible, owing to the negligible dimensional changes of the wood elements in the fiber direction. This is the case in particular if the fiber direction runs in the direction of the at least two mutually adjoining plate-like regions and perpendicular to the edges formed by the mutually adjoining regions. This is a further advantage in relation to other known core layers and multilayer composites produced therefrom, such as are produced for example from flat parts or from layers produced with parallel fibers, such as for example plywood or fiberboards.

Without restriction to one theory, it is assumed that the discussed advantages result from the structure of the wood elements of zig-zag-shaped form that are used in the core layer and in the multilayer composite, wherein said edge runs not parallel with respect to the fiber direction of the wood element, but preferably perpendicular thereto. Then, the structure of the wood element is still supported by the wood fibers, in particular at said edge. By contrast, wood elements produced from industrial waste have fibers which do not have the same preferential direction, but which extend isotropically in the three spatial directions. Then, the corresponding edges may run parallel to the fiber direction. Therefore, the structure of said wood elements is not supported at said edge, or is supported at said edge only to a lesser extent than in the case of wood elements such as are used in the core layer, and in the panel produced therefrom, according to the invention.

Furthermore, fastening means such as nails and screws or furniture connectors can achieve reliable purchase in the core layer according to the invention and in the multilayer composite according to the invention, because the structure of the core layer, while being of relatively low density, has only small cavities, that is to say exhibits a high level of homogeneity. It is thus also possible to realize a stable fastening to a support, for example to a wall.

Exemplary embodiments of the invention are schematically illustrated in the drawings. They will be discussed in more detail below with reference to the figures of the drawings.

FIG. 1 shows a longitudinal section through an embodiment of a wood element 1 of a multilayer composite according to the invention, preferably of a lightweight panel. The wood element has an edge in the form of a planar surface 1', and has a zig region 20 and a zag region 30, wherein said regions are planar surfaces.

Figure 2:
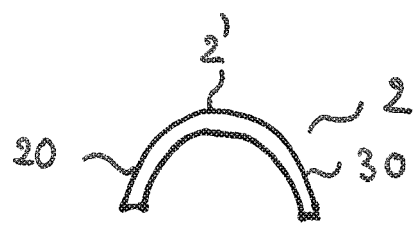

FIG. 2 shows a longitudinal section through an embodiment of a wood element 2 of a multilayer composite according to the invention, preferably of a lightweight panel. The wood element has an edge in the form of a convex surface 2', and has a zig region 20 and a zag region 30, which are each curved surfaces.

Figure 3:
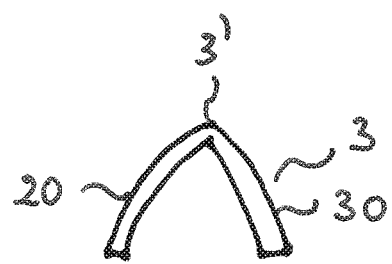

FIG. 3 shows a longitudinal section of an embodiment of a wood element 3 of a multilayer composite according to the invention, preferably of a lightweight panel. The wood element has a rectilinear edge 3' and has a zig region 20 and a zag region 30, which are each curved surfaces.

Figure 4:
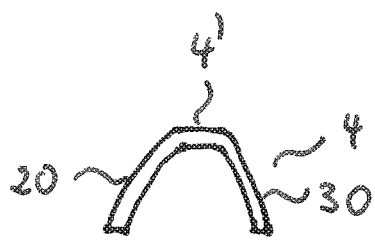

FIG. 4 shows a longitudinal section through an embodiment of a wood element 4 of a multilayer composite according to the invention, preferably of a lightweight panel. The wood element has an edge in the form of a planar surface 4', and has a zig region 20 and a zag region 30, which are each curved surfaces.

Figure 5:
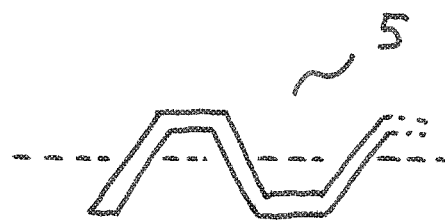

FIG. 5 shows a longitudinal section through an embodiment of a wood element 5 of a multilayer composite according to the invention, preferably of a lightweight panel. The wood element has repeating units of the wood element 1 of FIG. 1, and is thus of undulating form. The undulation has at least one positive half-wave and also at least one negative half-wave (with respect to the imaginary dashed line).

Figure 6:
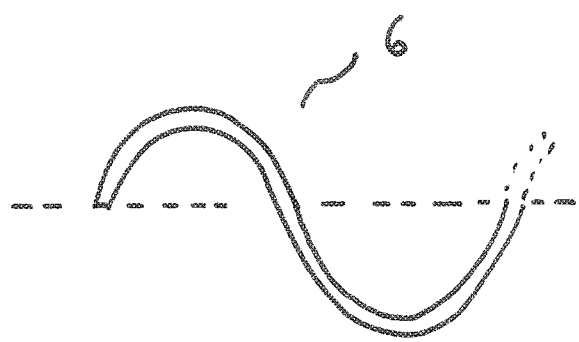

FIG. 6 shows a longitudinal section through an embodiment of a wood element 6 of a multilayer composite according to the invention, preferably of a lightweight panel. The wood element has repeating units of the wood element 2 of FIG. 2, and is thus of undulating form. The undulation has at least one positive half-wave and also at least one negative half-wave (with respect to the imaginary dashed line). The undulation can be characterized as a sinusoidal undulation.

Figure 7:
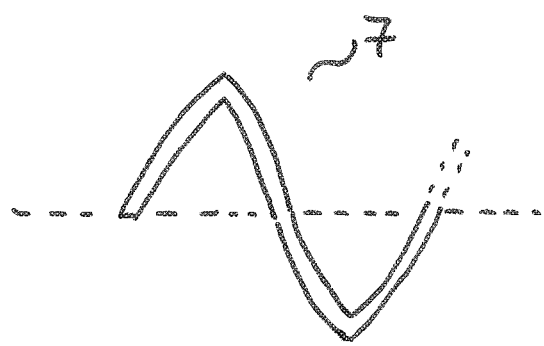

FIG. 7 shows a longitudinal section through an embodiment of a wood element 7 of a multilayer composite according to the invention, preferably of a lightweight panel. The wood element has repeating units of the wood element 3 of FIG. 3, and is thus of undulating form. The undulation has at least one positive half-wave and also at least one negative half-wave (with respect to the imaginary dashed line).

Figure 8:
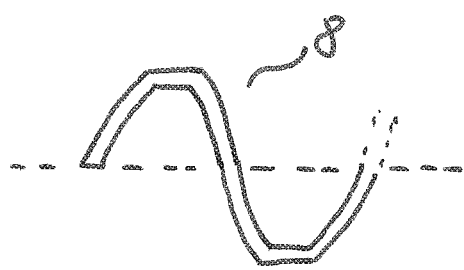

FIG. 8 shows a longitudinal section through an embodiment of a wood element 8 of a multilayer composite according to the invention, preferably of a lightweight panel. The wood element has repeating units of the wood element 4 of FIG. 4, and is thus of undulating form. The undulation has at least one positive half-wave and also at least one negative half-wave (with respect to the imaginary dashed line).

Figure 9:
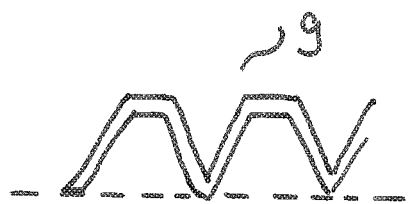

FIG. 9 shows a longitudinal section through an embodiment of a wood element 9 of a multilayer composite according to the invention, preferably of a lightweight panel. The wood element has repeating units of the wood element 1 of FIG. 1. The undulation has at least two positive half-waves but no negative half-wave (with respect to the imaginary dashed line).

Figure 10:
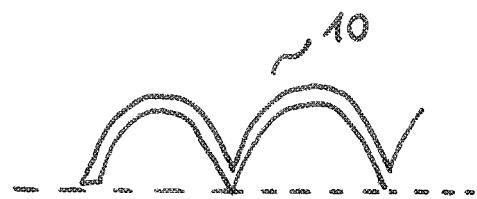

FIG. 10 shows a longitudinal section through an embodiment of a wood element 10 of a multilayer composite according to the invention, preferably of a lightweight panel. The wood element has repeating units of the wood element 2 of FIG. 2 and is thus of undulating form. The undulation has at least two positive half-waves but no negative half-wave (with respect to the imaginary dashed line).

Figure 11:
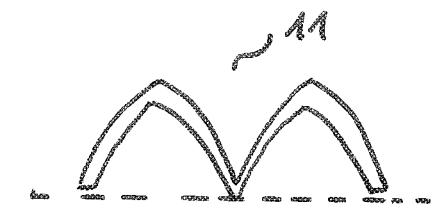

FIG. 11 shows a longitudinal section through an embodiment of a wood element 11 of a multilayer composite according to the invention, preferably of a lightweight panel. The wood element has repeating units of the wood element 3 of FIG. 3 and is thus of undulating form. The undulation has at least two positive half-waves but no negative half-wave (with respect to the imaginary dashed line).

Figure 12:

FIG. 12 shows a longitudinal section through an embodiment of a wood element 12 of a multilayer composite according to the invention, preferably of a lightweight panel. The wood element has repeating units of the wood element 4 of FIG. 4 and is thus of undulating form. The undulation has at least two positive half-waves but no negative half-wave (with respect to the imaginary dashed line).

Figure 13:
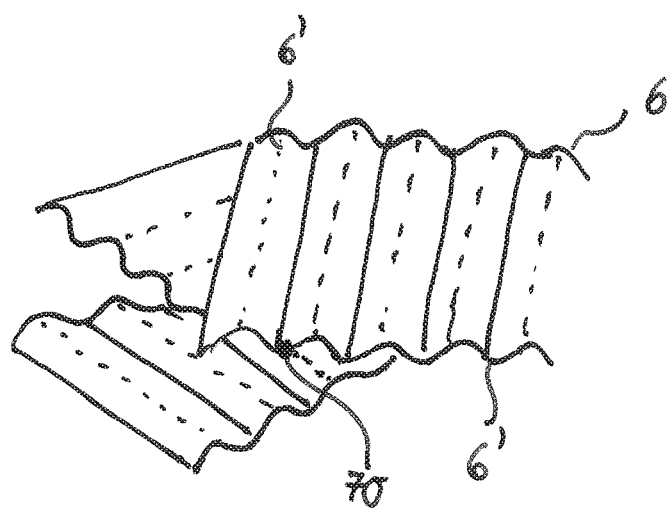

FIG. 13 shows an arrangement of wood elements 6 of undulating form in the core layer according to the invention of a further preferred embodiment of a multilayer composite according to the invention. The arrangement of the wood elements 6 is random. Therefore, the contact surface 70 between mutually adjoining wood elements is in each case a point 70. During the arrangement and subsequent adhesive bonding, the wood elements generally have punctiform connecting points 70 at the edges 6' which cross one another at different angles. During the moderate compression, said connecting points are in turn partially pushed one into the other by upsetting, thus permitting a homogenization of the structure. Depending on the degree of compression, a high to medium cavity fraction remains. This leads to a core layer with a low resulting density, because an orientation of the wood elements 6 along their preferential directions in this regard substantially does not arise. As a result, the core layer is more anisotropic, which implies an anisotropic mechanical characterization of the resulting panel. The structure that is obtained constitutes a random framework, the framework members of which are composed of parallel-fibered wood with high load-bearing capacity. As is generally known in frameworks, the upset, articulated member connections are not weak points, because a framework allows joints. A prerequisite is adequate adhesive bonding of the connecting points in order that longitudinal forces can be accommodated.

Figure 14:
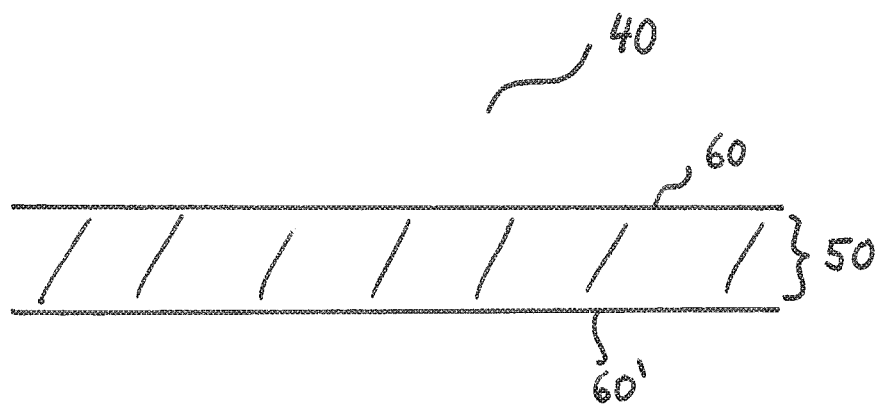

FIG. 14 shows an arrangement of wood elements of undulating form from FIG. 13 in the core layer 50 according to the invention of a further preferred embodiment of a multilayer composite 40 according to the invention. The core layer 50 is situated between the surface layers 60, 60', which may be the same as or different from one another, and is adhesively bonded thereto.

Aside from the resulting high compressive and shear strength and stiffness, resulting from the framework structure, of the finished lightweight component, the very low level of swelling of the lightweight panel in terms of thickness in the event of changes in moisture levels, which is achieved owing to the practically negligible swelling of the wood along the fiber direction, must be highlighted. In this way, a panel of said type would be superior to all other wood materials constructed from flat-lying particles or parallel-fibered layers, such as chipboards and fiberboards, plywood or wood core plywoods.

In one embodiment, the wood elements of zig-zag-shaped form may be combined with admixed planar-surfaced elements, that is to say elements of planar-surfaced form. Here, the wood elements of zig-zag-shaped form are preferably adhesively bonded to the planar-surfaced elements. Here, during the adhesive bonding, linear connecting points are formed, in part, between the elements of zig-zag-shaped form and the planar-surfaced elements, giving rise to an increased transverse tensile strength of the lightweight panel.

Wood elements of zig-zag-shaped form, combined with or without planar-surfaced wood elements, may also, in order to form a lightweight core, be mixed with conventional wood material elements such as wood chips or wood fibers. This glued mixture can be compressed to form a lightweight wood material panel, which exhibits further increased homogeneity. Here, it is particularly advantageous that existing technologies, for example from chipboard production, can be used, wherein it is possible to realize panels with a very much lower gross density than in the case of conventional panel production.

LIST OF REFERENCE DESIGNATIONS 1, 2, 3, 4 Wood elements
5, 6, 7, 8, 9, 10, 11, 12 Undulating wood elements
1', 2', 3', 4', 6' Edges
20, 30 Zig and zag regions
70 Connecting point of two edges
40 Multilayer composite
50 Core layer
60, 60' Surface layers

The invention claimed is:

1. A wood panel, comprising:
a first wood element including wood fibers and binder, wherein the first wood element has undulations that are three-dimensional which extend in at least one direction and periodically recur, and wherein the undulations have, as viewed in longitudinal section, repeating units in the form of a convex surface between a curved zig region and a curved zag region; and
a second wood element including wood fibers and binder, wherein the second wood element has undulations that are three-dimensional which extend in at least one direction and periodically recur, wherein the undulations of the second wood element are fixedly connected to the undulations of the first wood element such that the first and second wood elements are connected in a superimposed manner, wherein the undulations of the second wood element are arranged at an oblique angle to the undulations of the first wood element, and wherein the undulations of the second wood element are arranged at an angle that is neither 180° nor 360° to the undulations of the first wood element.

2. The wood panel according to claim 1, wherein the undulations of the second wood element are wave-shaped.

3. The wood panel according to claim 1, wherein the undulations of the second wood element have, as viewed in longitudinal section, repeating units in the form of a convex surface between a curved zig region and a curved zag region.

4. The wood panel according to claim 1, wherein the undulations of the first wood element have one or more of a variable amplitude and a variable wavelength.

5. The wood panel according to claim 1, wherein the undulations of the first wood element extend obliquely to a side edge of the second wood element.

6. The wood panel of claim 1, wherein the undulations of the first wood element have a first shape that is different from a second shape of the undulations of the second wood element.

7. The wood panel according to claim 1, wherein the first wood element has a thickness and the undulations have a height, and wherein a ratio of the height to the thickness is at least 2:1.

8. The wood panel according to claim 1, wherein at least one surface of the wood panel is connected to a planar element.

9. The wood panel according to claim 1, wherein the first wood element has a thickness in the range of from 0.2 mm to 3 mm.

10. The wood panel according to claim 9, wherein wood fibers of the first wood element have a length that is at least twice as long as the thickness of the first wood element.

11. The wood panel according to claim 10, wherein a height of the first wood element is in the range of from 0.8 mm to 8 mm.

12. A corrugated wood element composed of glued wood fibers, comprising:
a first wood element with plate-like regions arranged in a zig-zag-shaped fashion, wherein a zig region of the first wood element with an adjoining zag region of the first wood element form a common edge between them in such a way that the first wood element is of zig-zag shaped form, wherein
the plate-like regions of the first wood element are surfaces of curved form, and the common edge formed between the curved surfaces is a surface of curved form such that the first wood element has undulations with repeating units in the form of a sinusoidal function as viewed in longitudinal section, and
wherein the first wood element has a thickness in the range of from 0.2 mm to 3 mm and a height of the first wood element is in the range of from 0.8 mm to 8 mm.

13. The corrugated wood element according to claim 12, wherein the wood fibers of the first wood element are glued with a glue based on glutin, casein, urea-formaldehyde, phenol-formaldehyde, resorcinol-formaldehyde, polyvinyl acetate, and/or polyurethane.

14. The corrugated wood element according to claim 12, wherein the thickness is the smallest distance between two surfaces of a zig or a zag region and the height is the shortest distance between two imaginary planes between which the corrugated wood element can be arranged in such a way that the common edges which are formed between zig regions and zag regions of the corrugated wood element lie within one of the planes.

15. The corrugated wood element according to claim 12, wherein the corrugated wood element is in web form.

16. The corrugated wood element according to claim 12, wherein wood fibers of the first wood element have a length that is at least twice as long as the thickness of the first wood element.

17. The corrugated wood element according to claim 12, further comprising a second wood element with plate-like regions arranged in a zig-zag-shaped fashion with a common edge between a zig region and an adjoining zag region, wherein a common edge of the second wood element is fixedly connected to a common edge of the first wood element such that the first and second wood elements are connected in a superimposed manner, and wherein the common edges of the second wood element are arranged at an angle that is neither 180° nor 360° to the common edges of the first wood element.

18. A wood panel, comprising:
a first wood element including wood fibers and binder, wherein the first wood element has undulations that are three-dimensional which extend in at least one direction and periodically recur, and wherein the undulations have, as viewed in longitudinal section, repeating units in the form of a convex surface between a curved zig region and a curved zag region; and
a second wood element including wood fibers and binder, wherein the second wood element has undulations that are three-dimensional which extend in at least one direction and periodically recur, wherein the undulations of the second wood element are fixedly connected to the undulations of the first wood element such that the first and second wood elements are connected in a superimposed manner, wherein the undulations of the first wood element have a first shape that is different from a second shape of the undulations of the second wood element, and wherein the undulations of the second wood element are arranged at an angle that is neither 180° nor 360° to the undulations of the first wood element.

19. The wood panel according to claim 18, wherein the undulations of the second wood element are arranged at an oblique angle to the undulations of the first wood element, and wherein the undulations of the first wood element extend obliquely to a side edge of the second wood element.

20. The wood panel according to claim 18, wherein the undulations of the first wood element have one or more of a variable amplitude and a variable wavelength.

\* \* \* \* \*